UNITED STATES PATENT OFFICE.

FRITZ BENDER, OF MÜHLHEIM, GERMANY, ASSIGNOR TO A. LEONHARDT & CO., OF SAME PLACE.

ORANGE DYE.

SPECIFICATION forming part of Letters Patent No. 503,305, dated August 15, 1893.

Application filed March 4, 1892. Serial No. 423,773. (Specimens.)

*To all whom it may concern:*

Be it known that I, FRITZ BENDER, a subject of the Emperor of Germany, a resident at Mühlheim, in the Grand Duchy of Hesse, Germany, have invented a new and useful Improvement in Orange Coloring-Matter, of which the following is a specification.

This coloring matter which is derived from acridin may be produced by eliminating ammonia from tetramido derivatives of the general formula

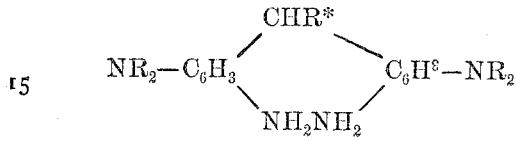

R* signifying hydrogen or an organic radical such as phenyl; R signifying a radical of the fatty series such as methyl or ethyl and oxidizing the leuco-compounds thus obtained.

The above mentioned tetramido derivatives can be manufactured by condensing aldehydes (such as formaldehyde or benzaldehyde or its substitutes) with aromatic substituted metadiamins (such as metaamidodimethylanilin or the like). Another way of producing these tetramido compounds consists in first condensing aldehydes with tertiary aromatic amins (such as dimethylanilin) and introducing then the two other amido-groups by nitration and reduction. The elimination of ammonia is best effected by heating the tetramido compounds with mineral acids such as hydrochloric acid or sulfuric acid. The oxidation can be carried out with most of the commonly used oxidizing agents (best with ferric chlorid) and even with the oxygen of the atmosphere. Instead of first forming leuco-bodies from formaldehyde and substituted aromatic metadiamins and then oxidizing them, the coloring matter can also be obtained by a direct heating of the acid corresponding with formaldehydes, viz: formic acid (or a mixture of oxalic acid and glycerin) with aromatic metadiamins in presence of a suitable condensing agent such as chlorid of zinc or stannic chlorid. The new basic orange coloring matter thus obtained dissolves in water or spirit giving orange colored solutions. Its yellowish solution in concentrated sulfuric acid shows a greenish fluorescence and when diluted with water turns from red to orange. Its watery solution is precipitated by the addition of caustic soda lye yielding yellow flakes of the free base of the coloring matter which dissolves in ether with a greenish fluorescence.

The following directions will show in what different ways this orange dyestuff may be produced.

First. 10.6 kilograms of benzaldehyde twenty-seven kilograms of metaamidodimethylanilin and twenty-four kilograms of muriatic acid of thirty per cent. are heated in an alcoholic solution at the reflux cooler until a sample dissolves completely or nearly so in water and the aldehyde has disappeared. The whole mass is then diluted with water and filtered if necessary and the product of condensation (tetramethyltetramidotriphenylmethan) is precipitated from the solution by carbonate of soda or ammonia or the like. Fifteen kilograms of this product are then heated with thirty kilograms of muriatic acid thirty per cent. and sixty liters of water in an autoclave during several hours up to about 150° centigrade. After cooling down the product of the reaction containing the leuco-compound is dissolved in dilute hydrochloric acid and is oxidized with a solution of ferric chlorid. After some standing when the formation of coloring matter is finished the latter is precipitated by chlorid of zinc, and can be purified by dissolving in water, filtering and precipitating again.

Second. 10.6 kilograms of benzaldehyde, thirty kilograms of metaamidodimethylorthotoluidin, ten kilograms of concentrated sulfuric acid and one hundred liters of spirit are heated at the reflux cooler for some time. Thus the sulfate of tetramethyltetramidoditolylphenylmethan separates, being nearly insoluble in spirit. It is converted into coloring matter by heating with dilute hydrochloric acid or dilute sulfuric acid up to 130° to 140° centigrade and oxidizing afterward in a similar way to that indicated under the first example. When I dissolve the sulfate just mentioned in ten parts of concentrated sulfuric acid and nitrate it in a cold state with the calculated quantity of strong nitric acid (diluted with sulfuric acid) I obtain mono nitro tetra methyl tetramido ditolyl phenylmethan which can be separated from the solution of its salts by soda lye or the like, forming a yellow precipitate. Another way to prepare a mononitro compound consists in heating for some time, say 1.5 kilograms of paranitrobenzyldehyde, three kilograms of metaamidodimethylorthotoluidin, one kilogram of concentrated sulfuric acid and ten liters of spirit at the reflux cooler, when the sulfate of the mononitro compound will gradually separate from the solution. This mononitro compound when transformed into orange coloring matter as stated above, yields a dyestuff of weak basic properties. I prefer therefore to reduce this mononitro compound say with protochlorid of tin and hydrochloric acid or with zinc dust and hydrochloric acid, in order to obtain the amido derivative which can be separated in a way well known to chemists, forming white flakes when precipitated with soda lye. This amido derivative when heated with one part by weight of concentrated sulfuric acid and twelve parts by weight of water during six hours up to 130° to 140° centigrade yields a leuco-compound from which an orange coloring matter can be obtained by oxidizing with ferric chlorid and precipitating with acetate of soda and chlorid of zinc. The so obtained coloring matter is easily souble in water.

Third. Fourteen kilograms of metaamidodimethylanilin are dissolved in thirty liters of spirit and five liters of concentrated hydrochloric acid. To this solution I add in a cold state 3.5 liters of a watery solution of formaldehyde of forty per cent. In this way tetramethyltetramidodiphenylmethan is formed which separates by adding an alcoholic solution of six kilograms of acetate of sodium. It is then heated as usual with dilute hydrochloric acid up to 140° centigrade and the leuco-compound is oxidized with ferric chlorid.

Fourth. 2.5 kilograms of tetramethyldiamidodiphenylmethan are dissolved in thirty-five kilograms of concentrated sulfuric acid and nitrated in a cold state with about two kilograms (two molecules) of nitric acid of 40° Baumé (previously diluted with sulfuric acid). After some standing the whole liquid is poured into two hundred and fifty liters of cold water and the binitro-compound is reduced by gradually adding about eight kilograms of zinc dust, the mass being well agitated during the reduction. It is then filtered and the filtrate is boiled down and finally heated for some time to about 140° centigrade. By thus operating oxidation is effected by means of the oxygen of the atmosphere. After cooling I dissolve the whole mass in water and precipitate the dyestuff by means of common salt. Instead of boiling down the product of reduction the tetramido derivative contained therein can be precipitated from the solution by an excess of soda lye and afterward heated with about four parts of dilute hydrochloric acid in a closed vessel for some time up to 140° centigrade. In this case it will be necessary in order to transform the whole into coloring matter to employ some oxidizing agent best (as usual) ferric chlorid. In an analogous way I obtain the orange coloring matter by employing tetraethyldiamidodiphenylmethan instead of the methyl derivative.

Fifth. A mixture of twelve kilograms of metaamidodimethylanilin, twelve kilograms of dehydrated oxalic acid, ten kilograms of glycerin and ten kilograms of chlorid of zinc is gradually heated while stirring well up to about 150° centigrade and kept at this temperature for some hours. When the formation of the orange coloring matter is finished the melt after some cooling is dissolved in acidulated water and the coloring matter is precipitated with common salt. In the same way I prepare the orange coloring matter by employing metaamidodimethylanilin instead of the methyl derivative.

What I claim as my invention, and desire to secure by Letters Patent, is—

As a new article of manufacture the basic orange coloring matter herein described derived from acridin, which dissolves in water or spirit giving orange colored solutions and which dissolves in concentrated sulfuric acid giving a yellowish solution with a green fluorescence, the said acid solution when diluted with water turning from red to orange and the watery solution being precipitated by the addition of caustic soda lye yielding yellow flakes of the free base of the coloring matter which dissolves in ether with a greenish fluorescence.

In testimony whereof I have signed my name to this specification in the presence of two subscribing witnesses.

FRITZ BENDER.

Witnesses:
FRIEDRICH QUEHL,
FRIEDRICH CORNELL.